(12) United States Patent
Selinger et al.

(10) Patent No.: US 11,974,714 B2
(45) Date of Patent: May 7, 2024

(54) WET/DRY VACUUM STAND AND BOTTOM DISCHARGE

(71) Applicants: Gregory M. Selinger, Ontario (CA); Angela F. Selinger, Ontario (CA)

(72) Inventors: Gregory M. Selinger, Ontario (CA); Angela F. Selinger, Ontario (CA)

( * ) Notice: Subject to any disclaimer, the term of this patent is extended or adjusted under 35 U.S.C. 154(b) by 0 days.

(21) Appl. No.: 17/703,091

(22) Filed: Mar. 24, 2022

(65) Prior Publication Data

US 2023/0301474 A1 Sep. 28, 2023

(51) Int. Cl.
| | |
|---|---|
| *A47L 7/00* | (2006.01) |
| *A47L 5/36* | (2006.01) |
| *A47L 9/00* | (2006.01) |
| *A47L 9/14* | (2006.01) |

(52) U.S. Cl.
CPC ............ *A47L 7/0038* (2013.01); *A47L 5/365* (2013.01); *A47L 7/0019* (2013.01); *A47L 9/009* (2013.01); *A47L 9/1409* (2013.01)

(58) Field of Classification Search
CPC ...... A47L 7/0038; A47L 5/365; A47L 7/0019; A47L 9/009; A47L 9/1409
See application file for complete search history.

(56) References Cited

U.S. PATENT DOCUMENTS

| | | | |
|---|---|---|---|
| 4,080,104 A | 3/1978 | Brown, Jr. | |
| 4,799,699 A | 1/1989 | Berfield et al. | |
| 5,433,463 A | 7/1995 | Finley | |
| 6,009,596 A | 1/2000 | Buss et al. | |
| 6,776,379 B2 | 8/2004 | Sherer et al. | |
| 8,807,493 B2 | 8/2014 | Kamon, II | |

FOREIGN PATENT DOCUMENTS

GB 1584489 2/1981

OTHER PUBLICATIONS

"Rigid Wet/Dry Vac Pump Accessory".
"Big Mike Wet-Dry Industrial Vacuum".

*Primary Examiner* — David Redding
(74) *Attorney, Agent, or Firm* — Bryan L. Loeffler, Esq.; Loeffler IP Group, P.A.

(57) ABSTRACT

A wet/dry vacuum (1) having a bottom vertical discharge (13) located on a collection tank (2) and an elevated rolling stand (14) that allows the wet/dry vacuum and collection tank to be rolled over a bucket or toilet and emptied of any collected liquids. A strainer 13 and hinged attachment to the stand allows a user to easily empty hard debris from the wet/dry vacuum by simply tipping the collection tank over from its elevated position into a trash can.

14 Claims, 7 Drawing Sheets

WET/DRY VACUUM STAND AND BOTTOM DISCHARGE

FIELD OF THE INVENTION

The present invention relates to wet/dry vacuums (also known as a shop vacuums and utility vacuums), and more particularly an elevated rolling stand for a wet/dry vacuum having a bottom vertical discharge that allows the wet/dry vacuum and bottom vertical discharge to be positioned over a bucket or toilet and emptied of any liquid contents. A strainer and hinged attachment to the stand allows a user to easily empty hard debris from the wet/dry vacuum by simply tipping it over from its elevated position into a trash can.

BACKGROUND OF THE INVENTION

Wet/dry vacuums are used to clean up dry debris as well as for liquid extraction to remove flooding caused by water leaks, plumbing backups, and so forth. When a wet/dry vacuum's collection tank is full, an upper vacuum assembly (which often includes a motor and an air impeller) is removed and the contents are dumped out. This can be a difficult task, especially if lifting and pouring the contents of the collection tank into a sink or toilet. This can also be a messy and unwieldy, especially depending on the types of liquids being collected.

One solution to emptying liquid from wet/dry vacuum collection tanks has been to provide an outlet on the sidewall of the collection tank. Such a solution is satisfactory when the contents of the collection tank are emptied into a floor drain, however, the collection tank must be lifted to a sink or toilet if no floor drains are available. In such cases the outlet at the bottom of the collection tank is of little value. In addition, side drains are not capable of fully emptying any liquid resting below the side outlet without tilting the collection tank to the side.

A second solution to emptying liquid from a collection tank is to provide an electric pump, usually with a motor located outside of or in the bottom of the tank. The pump removes liquid through a lower portion of the collection tank and expels it through a hose to a drain. While such pumps are generally effective with water cleanup, they are not effective with thick liquids and liquids having debris mixed in.

Therefore, a need exists for a wet/dry vacuum having a an elevated rolling stand for a wet/dry vacuum having a bottom vertical discharge that allows the wet/dry vacuum and bottom vertical discharge to be positioned over a bucket or toilet and emptied of any liquid contents

SUMMARY OF THE INVENTION

The primary object of the present invention is to provide an elevated rolling stand for a wet/dry vacuum having a bottom vertical discharge that allows the wet/dry vacuum and bottom vertical discharge to be positioned over a bucket or toilet and emptied of any liquid contents.

An additional object of the present invention is to provide a wet/dry vacuum having a strainer and hinged attachment to an elevated rolling stand that allows a user to easily empty hard debris from the wet dry vacuum by simply tipping it over from its elevated position into a trash can.

The present invention fulfills the above and other objects by providing a rolling stand having elongated legs for supporting a wet/dry vacuum (also known as a shop vacuum or utility vacuum) in an elevated position above the ground. A vertical discharge valve is located on the bottom surface of the wet/dry vacuum's collection tank. The rolling stand allows the wet/dry vacuum, collection tank, and vertical discharge to be rolled and positioned over a bucket, sink, toilet, or other drain to fully empty liquids from the collection tank.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
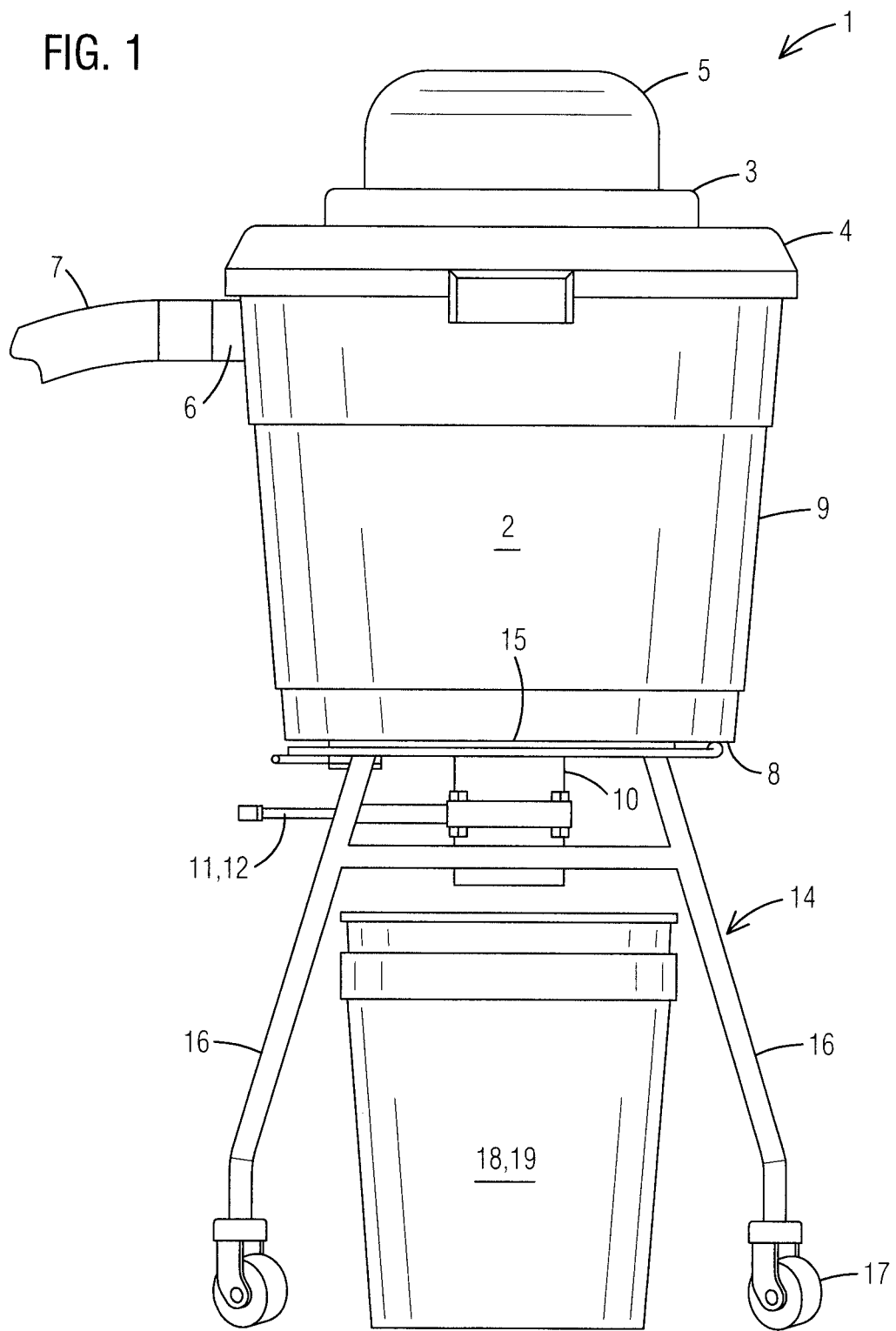
FIG. 1 is a side view of a wet/dry vacuum of the present invention positioned over a bucket.
Figure 2:
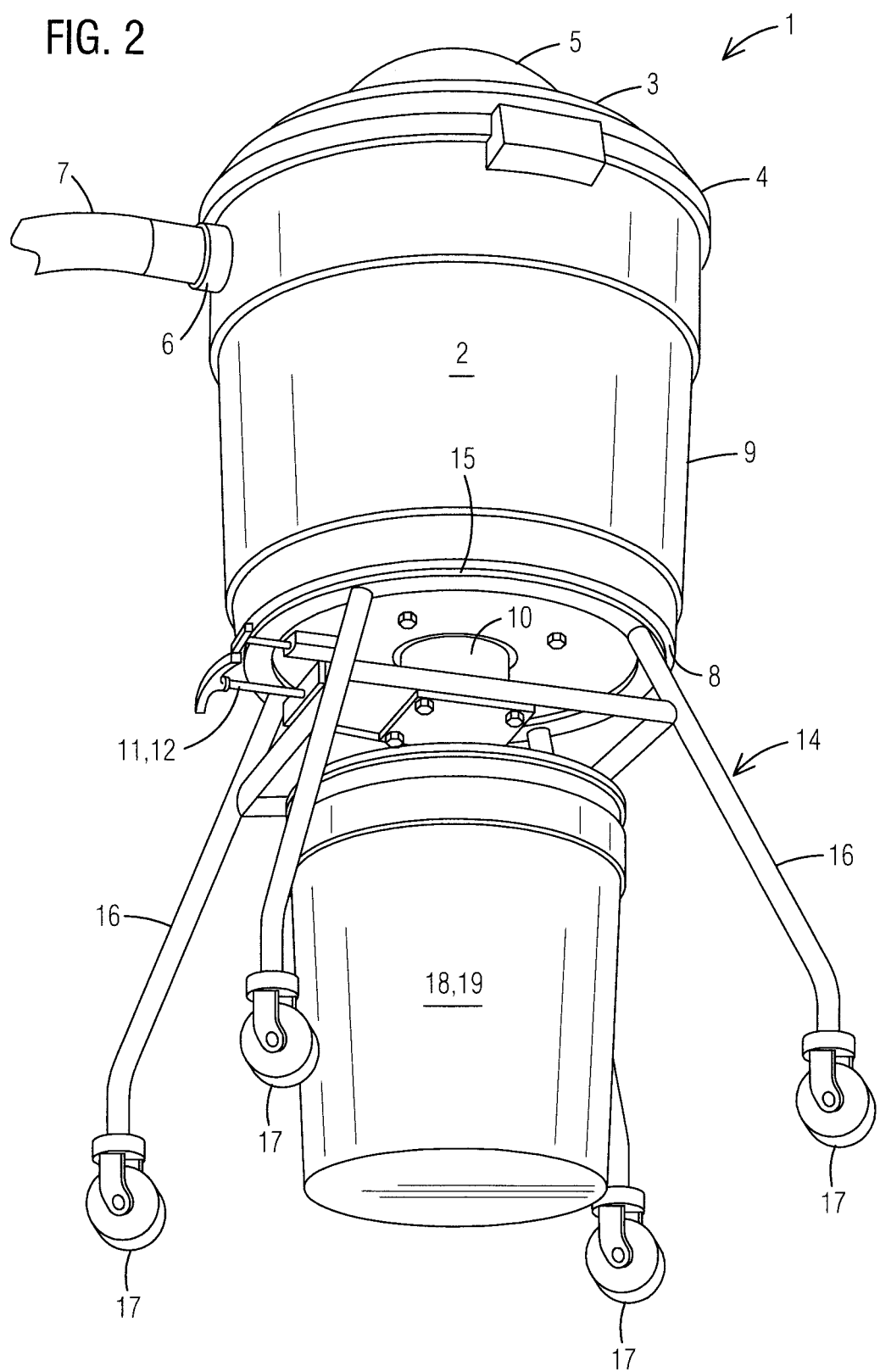
FIG. 2 is a bottom perspective view of the wet/dry vacuum of the present invention positioned over a bucket.

For purposes of describing the preferred embodiment, the terminology used in reference to the numbered accessories in the drawings is as follows:

1. quick draining wet/dry vacuum, generally
2. collection tank
3. vacuum assembly
4. lid
5. motor housing
6. inlet
7. vacuum hose
8. bottom panel of collection tank
9. perimeter side wall of collection tank
10. vertical discharge
11. valve
12. gate valve
13. strainer
14. elevated stand
15. seat
16. elongated leg
17. caster
18. drain
19. bucket With reference to FIGS. 1-6, a quick draining wet/dry vacuum 1 comprising a collection tank 2 that supports an upper vacuum assembly 3. The upper vacuum assembly 3 generally includes a lid 4, a motor housing 5. An inlet 6 is located on the tanks 2 and is fitted with a vacuum hose 7.

Figure 3:
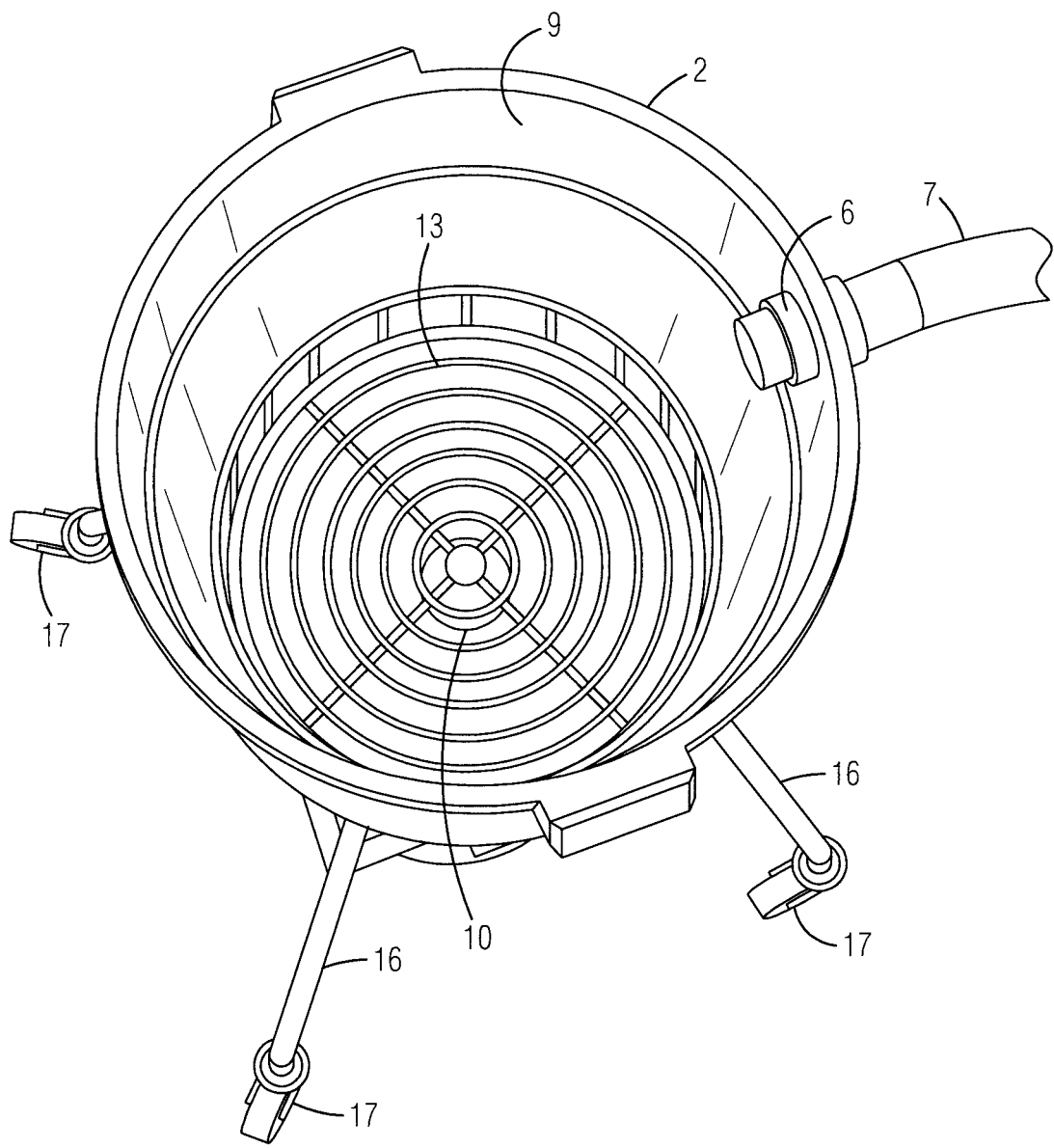
FIG. 3 is a top interior view of a collection tank of the present invention.
Figure 4:
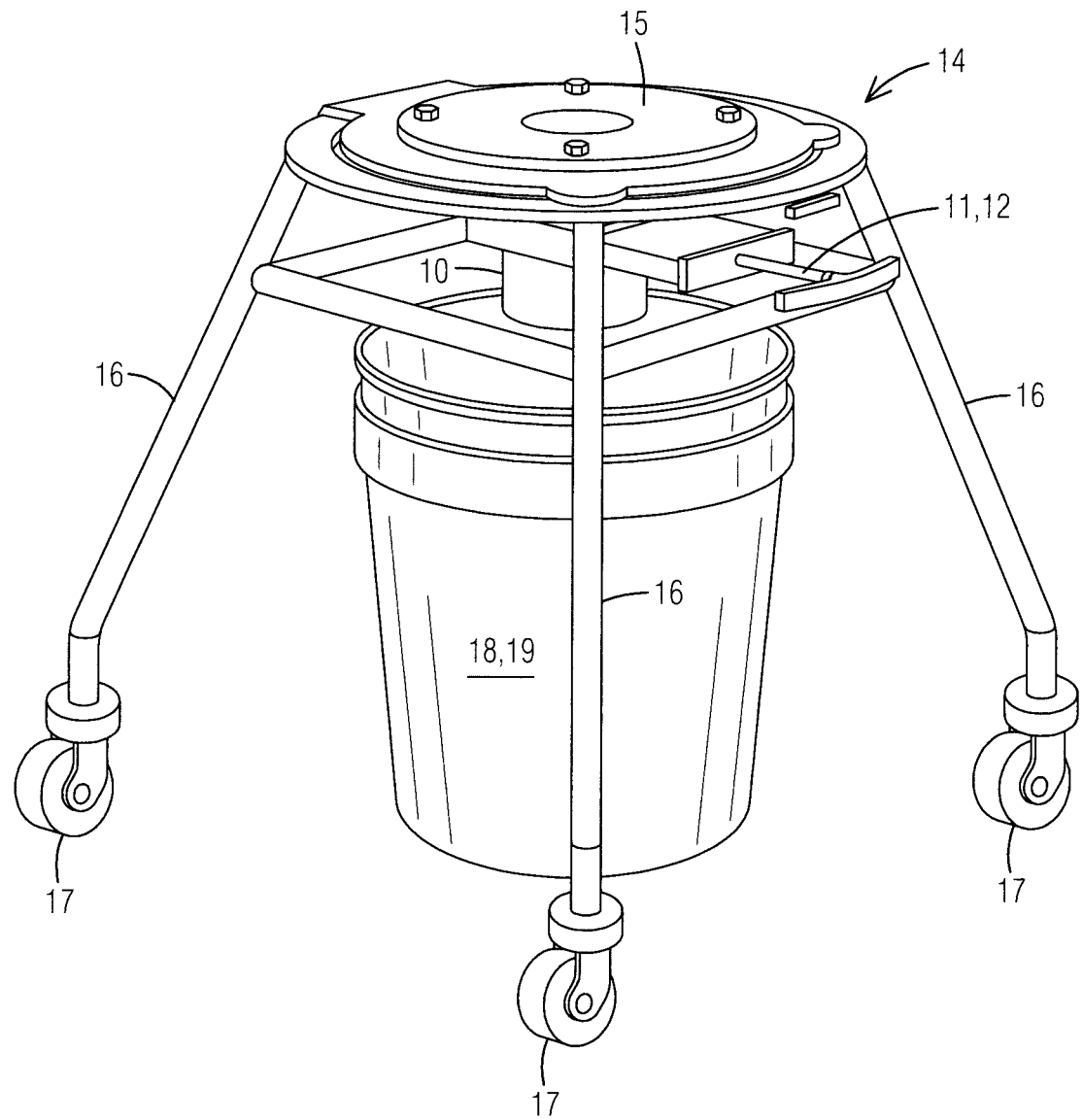
FIG. 4 is a top perspective view of an elevated stand of the present invention.
Figure 5:
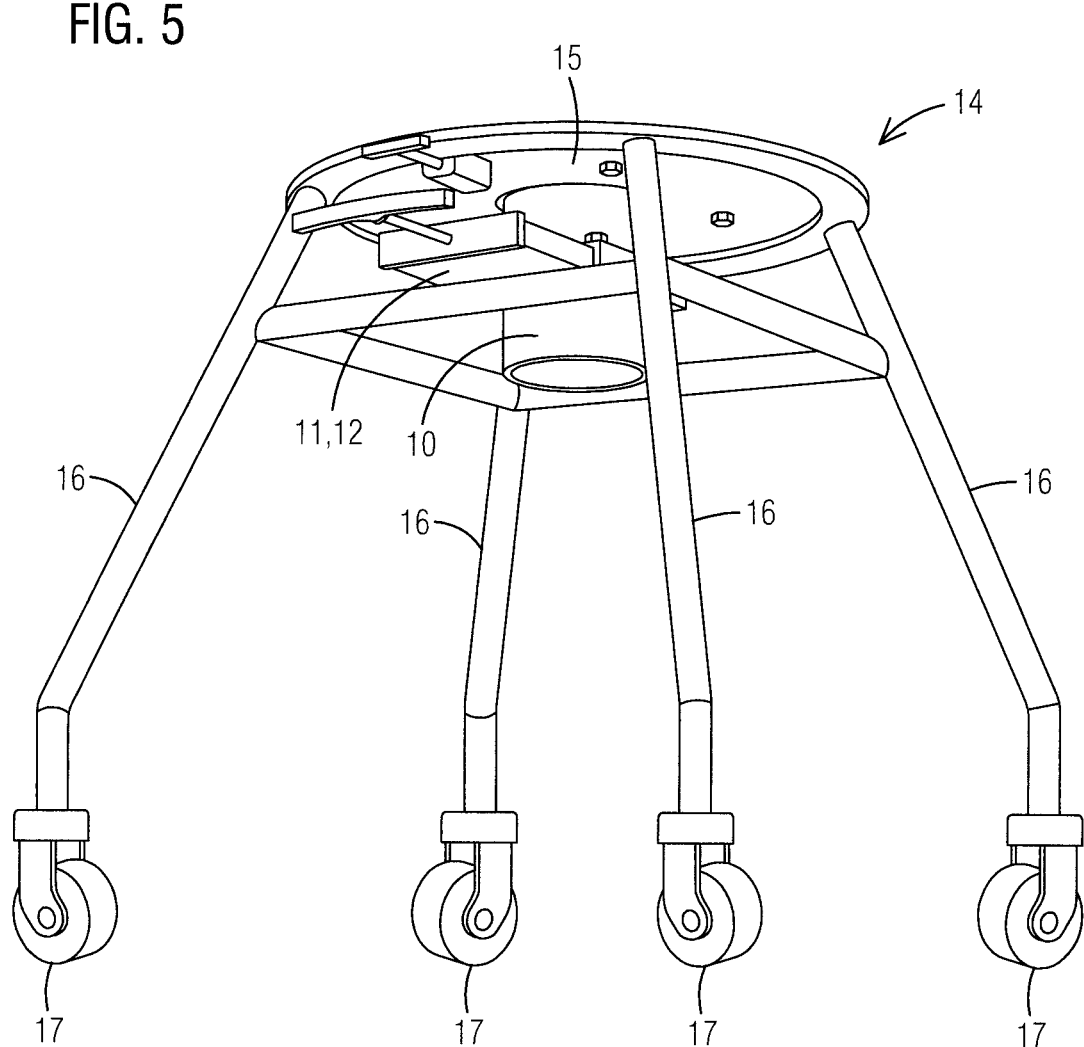
FIG. 5 is a bottom perspective view of an elevated stand of the present invention.
Figure 6:
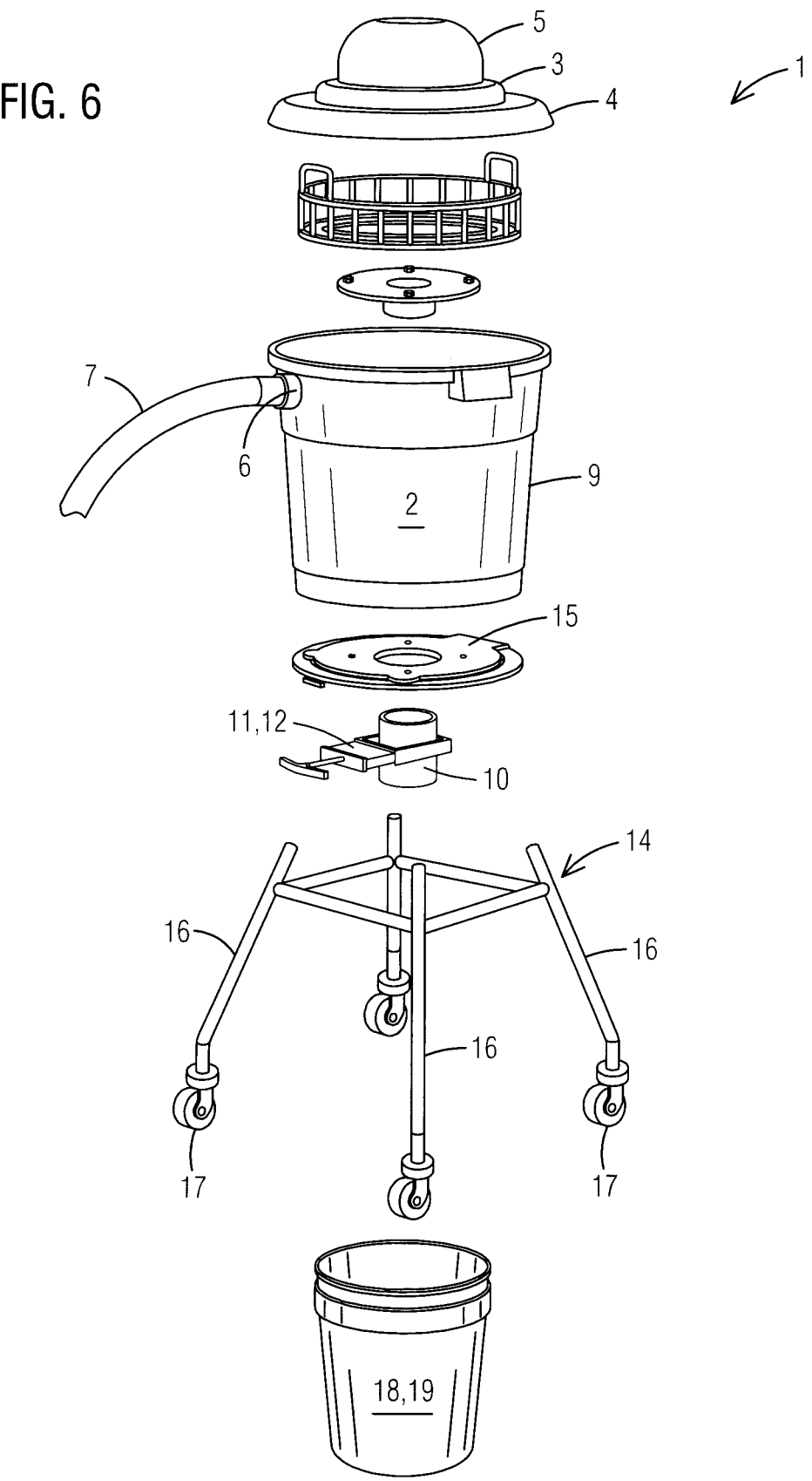
FIG. 6 is an exploded side view of the wet/dry vacuum of the present invention.

As illustrated in FIG. 3, the collection tank 2 includes a horizontal generally circular-shaped bottom panel 8 and a perimeter side wall 9 defining an interior space of the collection tank 2. A vertical discharge 10 is located centrally on the bottom panel 8 that allows the collection tank 2 to be fully evacuated of its contents. The vertical discharge 10 may be opened and closed using a valve 11, such as a gate valve 12. A strainer 13 is preferably located inside the collection tank 2 above the vertical discharge 10 to filter any debris out of liquid that is being drained from the collection tank 2.

The tank 2 is supported on an elevated stand 14 having a seat 15 supported by elongated legs 16 extending downward from the seat 15. The elongated legs 16 are supported by casters 17 that allow the wet/dry vacuum 1 to be rolled and positioned over a drain 18, such as a bucket 19, toilet, or other elevated drain, to fully empty the collection tank 2 into the drain 18 using the vertical discharge 10 and valve 11 extending downward from the bottom panel 8 of the collection tank 2.

Figure 7:
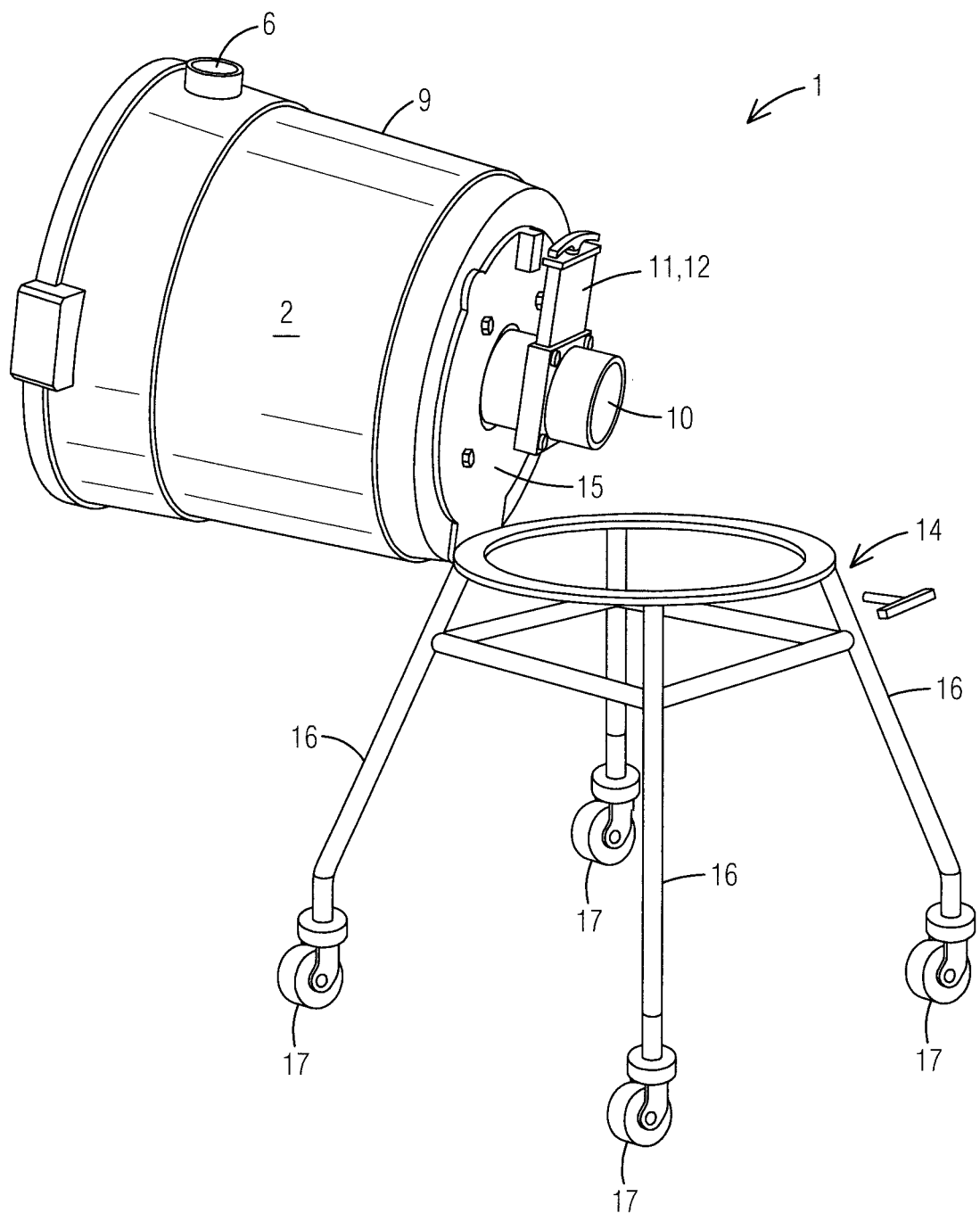
FIG. 7 is a side view of the collection tank hingedly attached to the elevated stand of the present invention and in a tipped position.

As illustrated in FIG. 7, the collection tank 2 may also be hingedly attached to the stand 7 to allow the collection tank 2 to be tipped to the side to pour contents, especially dry contents, out of the collection tank 2 without having to bend and pick up the collection tank 2 off of the ground to do so.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described our invention, we claim:

1. A quick draining wet/dry vacuum comprising:
   a collection tank having a horizontal flat bottom panel and a perimeter side wall defining an interior space of the collection tank for collecting liquid waste and debris;
   an upper vacuum assembly having a lid and a motor housing;
   an inlet leading into the collection tank and fitted with a vacuum hose; and
   a vertical discharge located centrally on the bottom panel that allows the collection tank to be fully evacuated of any liquid contents.

2. The quick draining wet/dry vacuum of claim 1 further comprising:
   an elevated stand having a seat for supporting said collection tank in an elevated position; and
   elongated legs extending downward from the seat and having casters located thereon that allow the wet/dry vacuum to be rolled and positioned over a drain.

3. The quick draining wet/dry vacuum of claim 2 wherein:
   said collection tank is hingedly attached to the stand to allow the collection tank to be tipped to the side to pour contents out of the collection tank.

4. The quick draining wet/dry vacuum of claim 1 wherein:
   said vertical discharge may be opened and closed using a gate valve.

5. The quick draining wet/dry vacuum of claim 1 further comprising:
   a strainer located inside the collection tank above the vertical discharge to filter any debris out of liquid that is being drained from the collection tank.

6. A quick draining wet/dry vacuum comprising:
   a collection tank having a horizontal flat bottom panel and a perimeter side wall defining an interior space of the collection tank for collecting liquid waste and debris;
   an upper vacuum assembly having a lid and a motor housing;
   an inlet leading into the collection tank and fitted with a vacuum hose;
   an elevated stand having a seat for supporting said collection tank in an elevated position; and
   elongated legs extending downward from the seat and having casters located thereon that allow the wet/dry vacuum to be rolled and positioned over a drain.

7. The quick draining wet/dry vacuum of claim 6 further comprising:
   a vertical discharge located centrally on the bottom panel that allows the collection tank to be fully evacuated of any liquid contents.

8. The quick draining wet/dry vacuum of claim 6 wherein:
   said collection tank is hingedly attached to the stand to allow the collection tank to be tipped to the side to pour contents out of the collection tank.

9. The quick draining wet/dry vacuum of claim 7 wherein:
   said vertical discharge may be opened and closed using a gate valve.

10. The quick draining wet/dry vacuum of claim 7 further comprising:
    a strainer located inside the collection tank above the vertical discharge to filter any debris out of liquid that is being drained from the collection tank.

11. A quick draining wet/dry vacuum comprising:
    a collection tank having a horizontal flat bottom panel and a perimeter side wall defining an interior space of the collection tank for collecting liquid waste and debris;
    an upper vacuum assembly having a lid and a motor housing;
    an inlet leading into the collection tank and fitted with a vacuum hose;
    an elevated stand having a seat for supporting said collection tank in an elevated position;
    elongated legs extending downward from the seat and having casters located thereon that allow the wet/dry vacuum to be rolled and positioned over a drain; and
    a vertical discharge located centrally on the bottom panel that allows the collection tank to be fully evacuated of any liquid contents.

12. The quick draining wet/dry vacuum of claim 11 wherein:
    said collection tank is hingedly attached to the stand to allow the collection tank to be tipped to the side to pour contents out of the collection tank.

13. The quick draining wet/dry vacuum of claim 11 wherein:
    said vertical discharge may be opened and closed using a gate valve.

14. The quick draining wet/dry vacuum of claim 11 further comprising:
    a strainer located inside the collection tank above the vertical discharge to filter any debris out of liquid that is being drained from the collection tank.

* * * * *